Patented Aug. 22, 1944

2,356,710

UNITED STATES PATENT OFFICE 2,356,710

2-MERCAPTO DIHYDRO PYRIMIDINE DERIVATIVES

Charles H. Stiteler, Naugatuck, Conn., assignor to United States Rubber Company, New York, N. Y., a corporation of New Jersey No Drawing. Application October 22, 1941
Serial No. 416,096

1 Claim. (Cl. 260—251)

This invention relates to the preparation of new pyrimidine derivatives by the reaction of 2-mercapto pyrimidines with sulphuric acid.

More particularly, the invention comprises subjecting an alkyl-substituted 2-mercapto dihydropyrimidine to the action of concentrated sulphuric acid at moderate temperatures, and warming the reaction mixture until evolution of sulphur dioxide has ceased. The resulting reaction product is isolated in the form of a sodium salt by treating the reaction mixture successively with lime and with sodium carbonate, filtering, and evaporating the filtrate until it crystallizes. From the sodium salt, the free acid may be re-formed by the addition of an equivalent of sulphuric acid.

A specific example of practicing the invention is as follows: 300 grams of 2-mercapto-6-methyl-4,6-diethyl dihydropyrimidine are added slowly to 600 cc. of 95% sulphuric acid while the mixture is stirred and cooled so as to maintain the temperature within the range from about 20° C. to about 40° C. This is continued until no more heat is evolved. The solution is then warmed until evolution of sulphur dioxide gas ceases. The mixture is then cooled and there is added to it a suspension of 600 grams of calcium hydroxide in 3 liters of water. This should be enough lime to precipitate all of the free sulphuric acid present as calcium sulphate and to form the soluble calcium salt of the sulphonated or sulphated mercapto pyrimidine derivative. The calcium is then removed by addition of sodium carbonate solution to the filtrate until there is no further precipitation of calcium carbonate. The calcium carbonate is removed by filtration, and the filtrate containing the sodium salt is evaporated until it is converted into a crystalline mass of pale yellow to white powder. The yield of the sodium salt obtained is 430 grams. The material is water-soluble, leaves an ash consisting of sodium sulphate amounting to 23% of the weight of the material upon ignition. The sulphur content of the dry material is found to be 21.5%.

Other metal salts may be prepared by treating aqueous solutions of the sodium or calcium salt with salts of the desired metals. For example, the calcium salt solution may be treated with nickel carbonate to form the nickel salt.

2-mercapto - 4,6-diethyl-6 methyl - dihydropyrimidine may be prepared as shown in U. S. Patent No. 2,234,848.

The reaction occurring when the mercapto pyrimidine starting material is reacted with the concentrated sulphuric acid is believed to involve addition of sulphuric acid at the double bond linking carbon atoms #5 and 6 of the pyrimidine ring. It is not known whether the free acid is a true sulphonic acid or whether it is a half ester of sulphuric acid. The sulphur content of the sodium salt of the acid is intermediate between that calculated for the sodium salt of the mercapto trialkyl tetrahydropyrimidine sulphonic acid, and the sodium salt of the corresponding half ester of sulphuric acid.

Mercapto dihydropyrimidines which may be used in the reaction include those obtainable by the reaction of ammonium thiocyanate with such aliphatic ketones as acetone, methyl ethyl ketone, diethyl ketone, dipropyl ketone, methyl propyl ketone, di-acetone alcohol, mesityl oxide, methyl isopropyl ketone, methyl butyl ketone, methyl isobutyl ketone, acetyl ketone, methyl amyl ketone, di-acetone amine, ethylidine acetone, methyl hexyl ketone, monohydroxy acetone, dihydroxy acetone, methyl-beta-hydroxy ethyl ketone, methyl-gamma-hydroxy propyl ketone, cyclopentanone, cyclohexanone, 4-methyl cyclohexanone; see U. S. Patent No. 2,234,848, referred to above for preparation.

The new chemicals may be used as wetting agents, insecticides, and fungicides.

Having thus described my invention, what I claim and desire to protect by Letters Patent is:

A member of the class consisting of the sulfuric acid conversion product of an alkyl-substituted-2-mercapto dihydro pyrimidine, and its metal salts, said conversion product being formed by reacting an alkyl-substituted-2-mercapto dihydro pyrimidine with concentrated sulfuric acid at a temperature of from about 20° C.–40° C., the reaction being characterized by the evolution of a substantial amount of sulfur dioxide, warming the reaction mixture until evolution of sulfur dioxide has ceased, and separating the resulting reaction product, the metal salt having a sulfur content intermediate between that calculated for the salt of the sulphonic acid and the half ester of the sulfuric acid.

CHARLES H. STITELER.